United States Patent [19]
Seki

[11] Patent Number: 5,809,206
[45] Date of Patent: Sep. 15, 1998

[54] INFORMATION SIGNAL REPRODUCING APPARATUS AND INFORMATION SIGNAL REPRODUCING METHOD

[75] Inventor: Yousuke Seki, Kanagawa, Japan

[73] Assignee: Sony Corporation, Tokyo, Japan

[21] Appl. No.: 750,275

[22] PCT Filed: Apr. 9, 1996

[86] PCT No.: PCT/JP96/00969

§ 371 Date: Apr. 10, 1997

§ 102(e) Date: Apr. 10, 1997

[87] PCT Pub. No.: WO96/32673

PCT Pub. Date: Oct. 17, 1996

[30] Foreign Application Priority Data

Apr. 9, 1995 [JP] Japan .................................. 7-109097

[51] Int. Cl.$^6$ ............................ H04N 5/911; H04N 5/781
[52] U.S. Cl. ............................................ 386/116; 386/125
[58] Field of Search .................................... 386/116, 124, 386/125, 46, 113, 126, 82, 70, 34–40, 109, 111, 112; 360/32; H04N 5/911, 5/781

[56] References Cited

U.S. PATENT DOCUMENTS

| | | | |
|---|---|---|---|
| 5,497,244 | 3/1996 | Chargin, Jr. et al. | 386/125 |
| 5,559,764 | 9/1996 | Chen et al. | 369/30 |
| 5,619,387 | 4/1997 | Ottesen et al. | 360/77.08 |
| 5,630,007 | 5/1997 | Kobayashi et al. | 386/113 |

FOREIGN PATENT DOCUMENTS 7-13707  1/1995  Japan .
7-200191 8/1995  Japan .

OTHER PUBLICATIONS

Patterson, David A., Gibson, Garth, and Katz, Randy H., "*A Case for Redundant Arrays of Inexpensive Disks (RAPID)*", ACM SIGMOD Conference, Chicago, Illinois, Jun. 1–3, 1988, pp. 109–116.

Primary Examiner—Robert Chevalier
Attorney, Agent, or Firm—Frommer Lawrence & Haug LLP; William S. Frommer

[57] ABSTRACT

An information signal reproducing apparatus and method is obtained which can reproduce video and audio signal promptly and precisely even if a disc recording medium expands and contracts because of the temperature change or position of a recording and reproducing head is shifted because of the mechanical error. If one of the plural reproduction means cannot reproduce the reproduction data, the reproduction data is restored from the other reproduction data reproduced by the other reproduction means: if n-th reproduction block is not reproduced by a predetermined time or started its reproduction at a predetermined timing, n+1-th block is not reproduced but n+2-th block is reproduced. The video and audio signal thus can be promptly and precisely reproduced in real time from the disc recording medium anytime.

6 Claims, 8 Drawing Sheets

MAX NUMBER OF CLIPS    500 CLIPS
CLUSTER SIZE    256 SECTORS

|  | SECTOR |
|---|---|
| TOTAL SECTOR | 4189000 |
| ID | 2 |
| FORMAT | 2 |
| IMAGE DATA | 4187703 |
| CONTROL | 1293 |

| CONTROL | 1293 |
|---|---|
| SYSTEM INFORMATION | 40 |
| FILE INFORMATION | 125 |
| FAT | 128 |
| RESERVED | 1000 |

SYSTEM INFORMATION    19.57813 SECTORS
FILE INFORMATION    125 SECTORS
FAT    63.89928 SECTORS REPRODUCTION TIME    16358.21 SECONDS
REPRODUCTION TIME    4.543949 HOURS
REPRODUCTION TIME/500 CLIPS    32.71643 SECONDS
MEMORY    42 Kbytes

INFORMATION SIGNAL REPRODUCING APPARATUS AND INFORMATION SIGNAL REPRODUCING METHOD

DESCRIPTION

1. Field of the Industrial Application

The present invention relates to an information signal reproducing apparatus and an information signal reproducing method and is, in particular, suitably applied to an audio and/or video server system, for example.

2. Background Art

As an device for supplying video signal and audio signal to plural terminal devices respectively from one video and audio supplying source provided in the broadcasting station, an audio video server system (hereinafter referred to as an AV server system) has been proposed. For the construction of the AV server system, it is proposed that video signal and audio signal are stored in a media unit having plural built-in disk devices so as to transmit the selected video signal and audio signal from the media unit to terminal devices.

Such AV server systems, however, need to send out video signal continuously to each terminal device. The media unit of AV server system therefore reproduces video and audio signal from the disc recording medium in the disk device in order that the video signal having the fixed amount of data can be supplied constantly to each terminal device.

The disk device for reproducing video and audio signal from a disc recording medium will be described below. In this case a hard disk device is used as the disk device.

A hard disk device has such construction that a hard disk being a disc recording medium is rotated and the video and audio signal are recorded and reproduced on and from the hard disk by a recording and reproducing head. At this point, since normally there is only one recording and reproducing head, the recording and reproducing head accesses to the video and audio signal on the hard disk sequentially.

Furthermore, since the recording and reproducing head works mechanically, it takes longer access time when the access position of the recording and reproducing head is largely changed, i.e., in seek time, as compared with the case of accessing continuous positions. Moreover, after the recording and reproducing head moves, a certain time is required till the position where the selected video and audio signal are recorded reaches the position of the recording and reproducing head. It is called rotational latency time.

Here, constant supply of the fixed amount of data of video and audio signal to each terminal device, such as the above-mentioned disk device used in the AV server system, requires the capacity for continuous output of the video and audio signal with taking the total access time including seek time, rotational latency and output of data into account.

Moreover, the AV server system requires real time accessability because the data to be read out from the hard disk is video and audio signal. For example, if the reproduced video and audio signal is supplied continuously 128 [kByte] per one second to one terminal device, image will be discontinued. Therefore, in order to supply the video and audio signal continuously to twelve terminal devices, it is necessary to reproduce video and audio signal of 128 [kByte]*12 [channels]=1536 [kByte] from the hard disk.

Further, mechanical work of the hard disk device sometimes produces unexpected action even though the occurrence frequency is low. For example, when the video and audio signal is accessed by moving the head onto the fixed circular track of hard disk, there are cases where data cannot be read out correctly because of the head position shift caused by expansion and contraction of each member because of temperature and mechanical operation error. In this case, the hard disk device corrects the position of the recording and reproducing head and accesses again. Normally, in the course of repetition of these operations, the correct data can be read out.

Repeating these operations, however, makes rotational latency time specifically longer and access speed becomes low. Resultingly, at the time when the reproduction data is supplied to each channel, if a block of the fixed amount of data of video and audio signal that have to be read out in one second, more specifically for example 950 [msec], taking overhead time on the control system into consideration were read out in 1.3 [sec], it can cause problems with video and audio signal cut off because the block of the video and audio signal cannot catch up with the reproduction.

DISCLOSURE OF THE INVENTION

The present invention has been done considering the above points and is proposing an information signal reproducing apparatus and an information signal reproducing method capable of supplying continuous video signal to plural channels.

The present invention is concerned with the information signal reproducing apparatus for outputting information data reproduced from the recording medium, comprising: plural reproduction means for reproducing the information data, which is divided into plural data blocks and recorded separately from next data block on different disc recording medium, from plural disc recording media for each reproduction block consisting of a predetermined number of data blocks; error correction code reproduction means for reproducing error correction code data, which is generated for each data block as many as the reproduction means out of the plural data blocks and recorded on the other disc recording medium, from the other disc recording medium; error correction means for restoring correct data to be reproduced in a certain reproduction means with both data reproduced by the other reproduction means and an error correction code data reproduced by the error correction code reproduction means when there is any error in the data of the data block reproduced by the above certain reproduction means out of the plural reproduction means or when the data is not reproduced by the above certain reproduction means out of the plural reproduction means; and control means for controlling operation of the plural reproduction means and the error correction code reproduction means, in which, when the above certain reproduction means has not finished reproducing n-th ("n" is a positive integer) reproduction block by a predetermined time, the control means controls operation of the plural reproduction means so that the certain reproduction means does not reproduce n+1-th reproduction block but n+2-th reproduction block.

Further, the present invention is concerned with the information signal reproducing apparatus for outputting information data reproduced from the recording medium, comprising: plural reproduction means for reproducing the information data, which is divided into plural data blocks and recorded separately from next data block on different disc recording medium, from plural disc recording media for each reproduction block consisting of a predetermined number of data blocks; error correction code reproduction means for reproducing error correction code data, which is generated for each data block as many as the reproduction means out of the plural data blocks and recorded on the other disc recording medium, from the other disc recording medium; error correction means for restoring correct data to be reproduced in a certain reproduction means with both data reproduced by the other reproduction means and an error correction code data reproduced by the error correction code reproduction means when there is any error in the data of the data block reproduced by the above certain reproduction means out of the plural reproduction means or when the data is not reproduced by the above certain reproduction means out of the plural reproduction means; control means for controlling operation of the plural reproduction means and the error correction code reproduction means; in which, when the above certain reproduction means has not started reproducing n+1-th ("n" is a positive integer) reproduction block at a predetermined timing, the control means controls operation of the plural reproduction means so that the certain reproduction means does not reproduce n+1-th reproduction block but n+2-th reproduction block.

Further, in the information signal reproducing apparatus of the present invention, the information data is divided into plural data blocks according to a predetermined amount of data and recorded on the plural disc recording media; and each m-th (m=1, 2, 3, . . . ) data block is reproduced by m-th reproduction means out of the plural reproduction means.

Further, the present invention is concerned with the information signal reproducing method for outputting the information data reproduced from the recording medium, comprising the steps of: reproducing information data, which is divided into plural data blocks and recorded separately from next data block on different disc recording medium, from plural disc recording media for each reproduction block consisting of a predetermined number of data blocks; reproducing error correction code data, which is generated for each data block as many as the plural disc recording media out of the plural data blocks and recorded on the other disc recording medium from the other disc recording media; restoring correct data to be reproduced from a certain disc recording medium with both data reproduced from the other disc recording medium and a reproduced error correction code data when there is any error in the data of the data block reproduced from the above certain disc recording medium out of the plural disc recording media or when the data is not reproduced from the above certain disc recording medium out of the plural disc recording media; and wherein, when the above certain reproduction means has not finished reproducing n-th ("n" is a positive integer) reproduction block by a predetermined time, n+1-th reproduction block is not reproduced from the certain disc recording medium but n+2-th reproduction block.

Further, the present invention is concerned with the information signal reproducing method for outputting the information data reproduced from the recording medium, comprising the steps of: reproducing information data, which is divided into plural data blocks and recorded separately from next data block on different disc recording medium, from plural disc recording media for each reproduction block consisting of a predetermined number of data blocks; reproducing error correction code data, which is generated for each data block, as many as the plural disc recording media out of the plural data blocks from the other disc recording media; restoring correct data to be reproduced from a certain disc recording medium with both data reproduced from the other disc recording medium and a reproduced error correction code data when there is any error in the data of the data block reproduced from the above certain disc recording medium out of the plural disc recording media or the data is not reproduced from the above certain disc recording medium out of the plural disc recording media; and wherein, when the above certain reproduction means has not finished reproducing n+1-th ("n" is a positive integer) reproduction block at a predetermined timing, n+1-th reproduction block is not reproduced from the certain disc recording medium but n+2-th reproduction block.

According to the present invention, the information data divided into plural blocks is recorded separately from next data block on different disc recording medium. If one of the plural reproduction means cannot reproduce the reproduction data, the reproduction data is restored from the other reproduction data reproduced by the other reproduction means: if n-th reproduction block is not reproduced by a predetermined time or started its reproduction at a predetermined timing, n+1-th block is not reproduced but n+2-th block. The video and audio signal thus can be promptly and precisely reproduced from the disc recording medium anytime.

BEST MODE FOR CARRYING OUT THE INVENTION

Referring to FIGS. 1 to 9, one embodiment of the information signal reproducing apparatus of the present invention will be hereinafter described.

First, an embodiment of an audio video server system (hereinafter referred to as AV server system) 20 to which an information signal reproducing apparatus of the present invention is applied will be described referring to FIG. 1. Video and audio data D20 output from data supplying source 22 composed of a video tape recorder 21 with the reproduction function is supplied to an encoder 24 in an encode unit 23. The encoder 24 compressively encodes the supplied video and audio data D20 with, for example, the compression algorithm according to the standard of MPEG 2 so as to generate encoded video and audio data D21. The encoded video and audio data D21 encoded in the encoder 24 is supplied to a server unit 25.

The server unit 25 is composed of a media control unit 26 and a plurality of media units 27A1 to 27A7 and the encoded video and audio data D21 encoded in the encoder 24 is supplied to the media control unit 26. The media units 27A1 to 27A7 respectively have plural built-in hard disk devices. The media control unit 26 in the server unit 25 supplies input encoded video and audio data D21 to one of media units 27A1 to 27A7 in response to write control signal supplied from a control unit 28 via a control line S1. Further, the media control unit 26 drives the hard disk devices in the media units 27A1 to 27A7 in response to reproduction control signal supplied from a control device 29 via a control line S2 so as to reproduce desired encoded video and audio data from the hard disks.

The media control unit 26 have a built-in decoder unit 35 (FIG. 2), which decodes encoded video and audio data reproduced by the hard disk devices. Further, the media control unit 26 have data transmission function, which selectively supplies video and audio data D22 decoded by an error code decoder 34 and a decoder unit 35 to, for example, terminal devices 28A1 to 28A12 having television image receiver device according to transmission control signal supplied from the control device 29 via the control line S2.

Incidentally, in the AV server system 20, the encoding operation of the encoder 24 and the reproducing operation of the data supplying source 22 are respectively controlled by control signal supplied from the control unit 28 via control lines S3 and S4. Further, the control unit 28 supervises the operating conditions of the encoder 24 and the data supplying source 22 based on the operating condition notification signal supplied via the control lines S3 and S4. Further, the control device 29 controls the operation of the control unit 28 such as start, termination, etc., via the control line S5.

Figure 1:
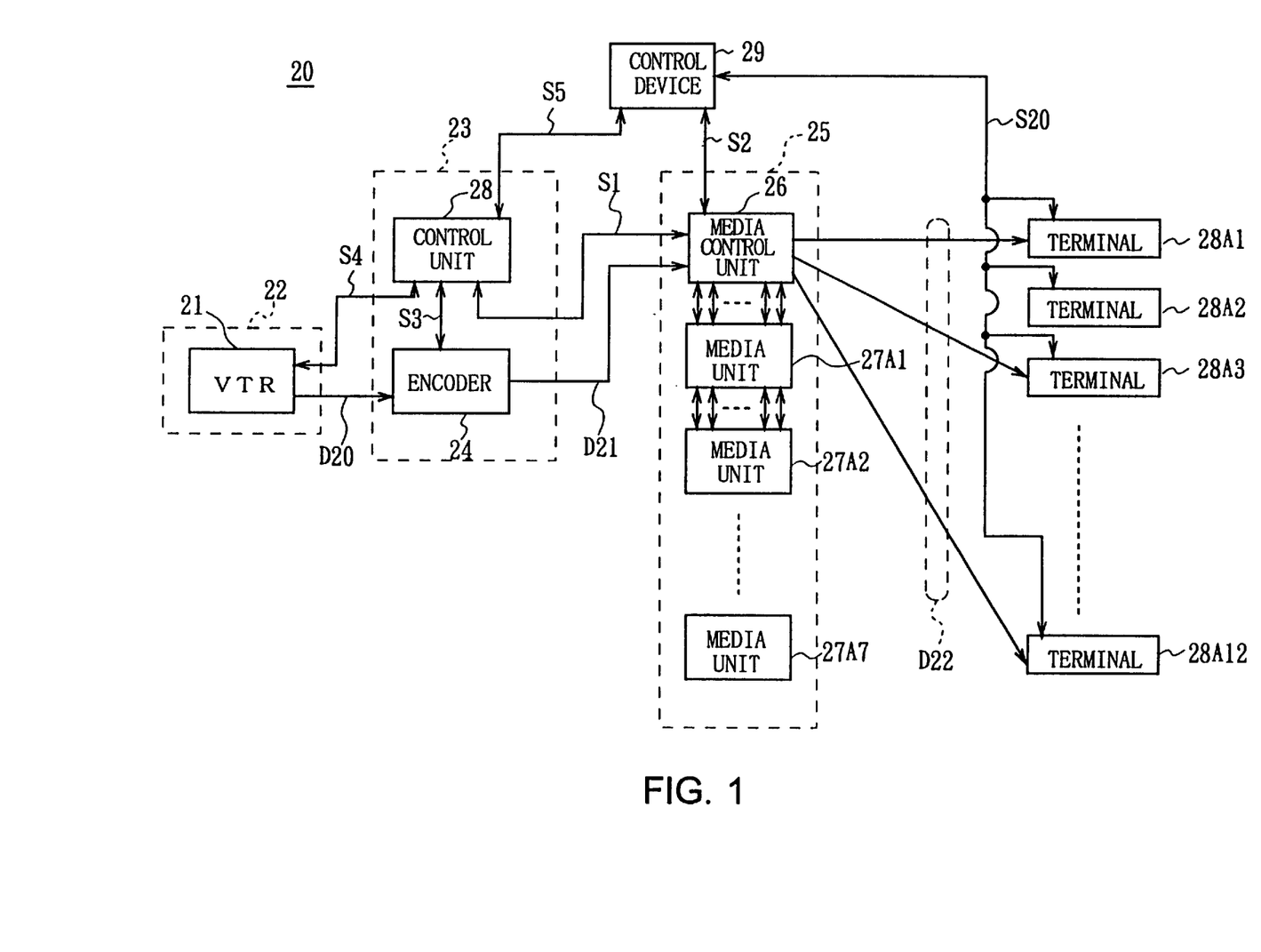
FIG. 1 is a block diagram showing an embodiment of AV server system to which the present invention is applied.
Figure 2:
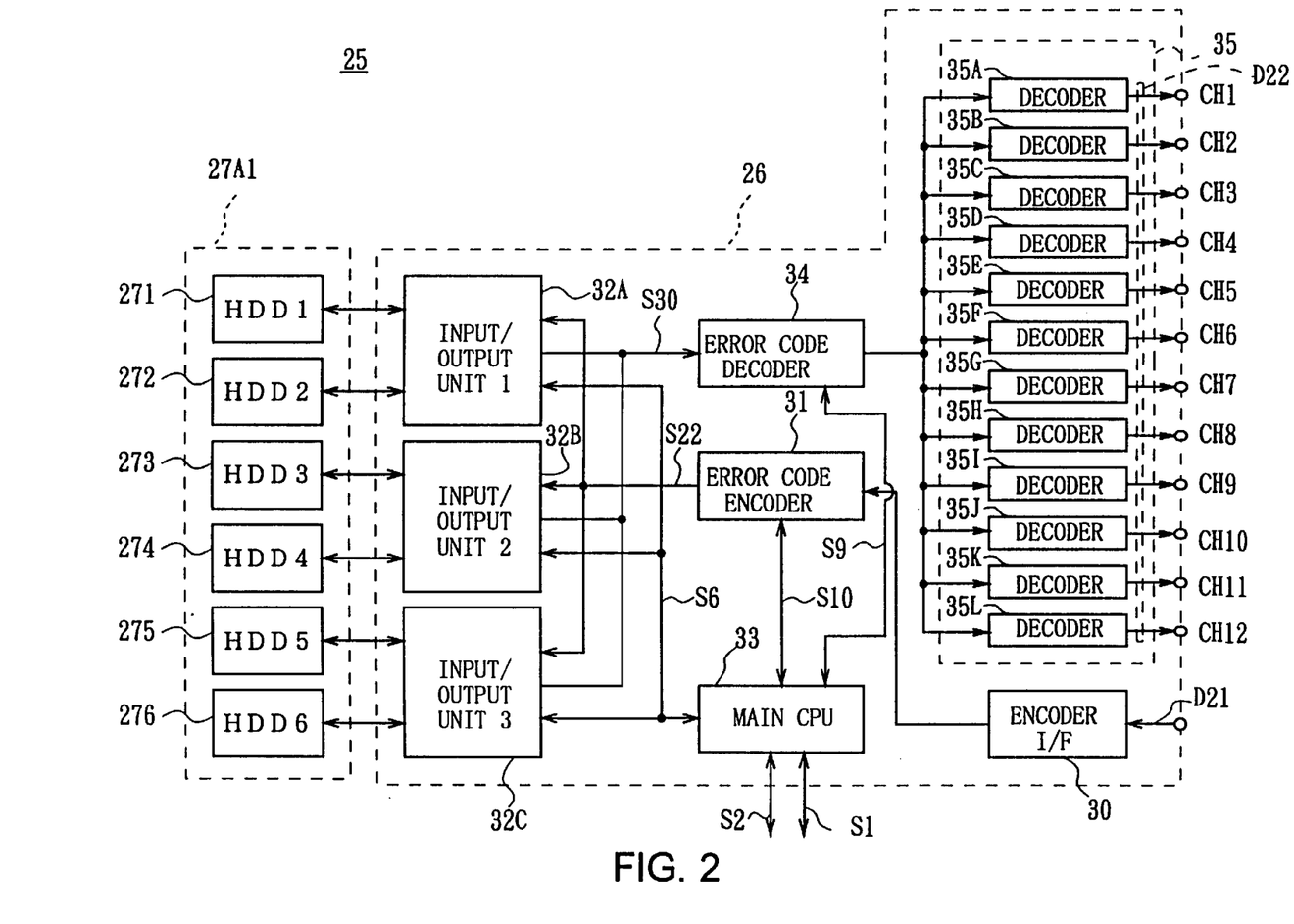
FIG. 2 is a block diagram showing an embodiment of a server unit of the AV server system shown in FIG. 1.

Next, the construction of the server unit 25 is described referring to FIG. 2. In order to simplify the description, the description will be made of the embodiment of recording and reproducing the encoded video and audio data to and from the hard disk devices in the media unit 27A1 out of the media units 27A1 to 27A7 shown in FIG. 1.

First, the description will be made of the case where the encoded video and audio data D21 supplied from the encoder 24 shown in FIG. 1 is recorded in the hard disk by the hard disk devices 271 to 276 in the media unit 27A1 of the server unit 25.

The encoded video and audio data D21 output from the encoder 24 is supplied to an error code encoder 31 via a encoder interface 30. The error code encoder 31 divides the encoded video and audio data D21 into five for each predetermined data amount, for example for each five bytes, so as to form respective data blocks each of which has one byte, and then sequentially supplies the formed data block to input/output units 32A, 32B and 32C via the signal line S22. For example, the head and second data blocks in the data blocks each having one byte which are divided into five are supplied to the input/output unit 32A, the third and fourth data blocks are supplied to the input/output unit 32B, and the fifth data block is supplied to the input/output unit 32C. The error code encoder 31 generates error correction code from the data divided into five so as to supply it to the input/output unit 32C. XOR code, for example, is applied to the error correction code.

Main CPU 33 of the media control unit 26 receives write control signal from the control unit 28 via the control line S1 and, in response to the control signal, supplies the control signal for recording the encoded video and audio signal and the error correction code to the hard disk devices 271 to 276 to the input/output units 32A to 32C via a control line S6.

Figure 3:
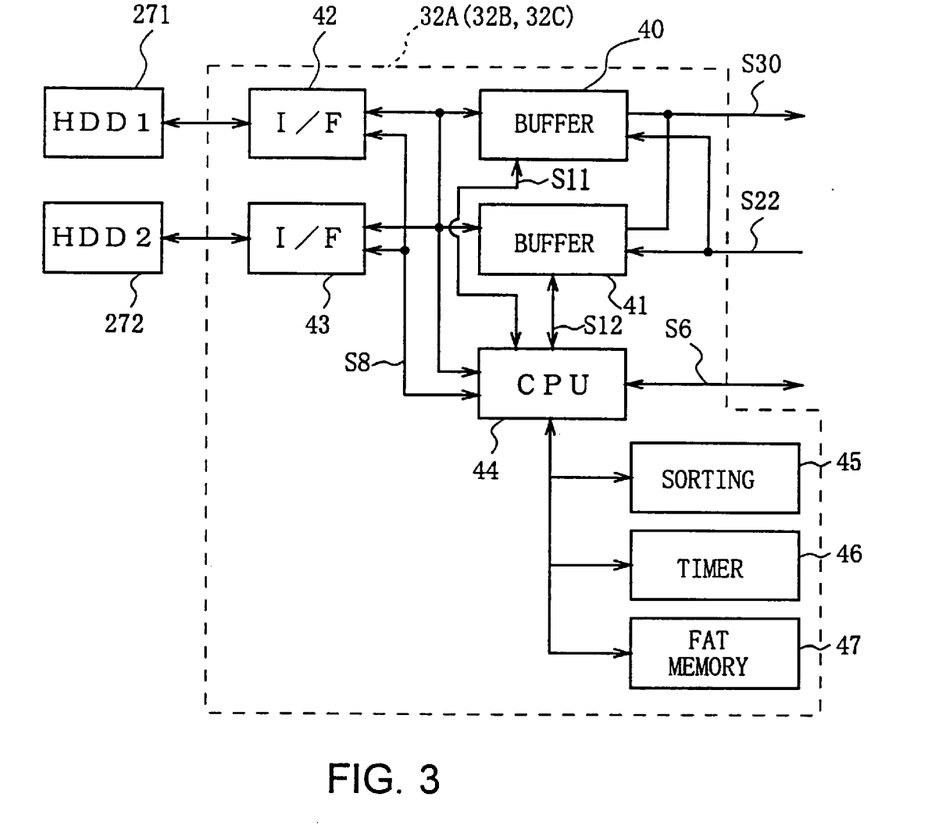
FIG. 3 is a block diagram showing an embodiment of input/output unit of the server unit shown in FIG. 2.

Here, the description will be made of the construction of the input/output units 32A to 32C referring to FIG. 3. The input/output units 32A to 32C have the same construction with each other, so that FIG. 3 shows the construction of only the input/output unit 32A.

The control signal supplied from the main CPU 33 via the control line S6 is supplied to a CPU 44. The head and second data blocks described above are supplied from the error code encoder 31 via a signal line S22 to buffer memories 40 and 41, both of whose buffers are double. When receiving the control signal via the signal line S6, the CPU 44 supplies the control signal to the interfaces 42 and 43 via the control line s8 in order that giving the read signal via the control signal S11 makes the buffer memory 40 supply the stored head data block to the hard disk device 271 and also giving the read signal via the control signal S12 makes the buffer memory 41 supply the stored second data block to the hard disk device 272. It makes the interface 42 read out the aforementioned head data block from the buffer memory 40 to supply to the hard disk device 271 which records the data on the hard disk. Further, the interface 43 reads out the aforementioned second data block from the buffer memory 41 to supply to the hard disk device 272 which records the data on the hard disk.

The input/output unit 32B has the same construction and recording operation as the input/output unit 32A excepting a point that the head and second data blocks are substituted for the third and fourth data blocks. Moreover, the input/output unit 32C have the same construction and recording operation as the input/output unit 32A excepting a point that the head and second data blocks are substituted for the fifth data block and the error correction code data.

Above operation makes the input/output units 32A to 32C possible to record the encoded video and audio data supplied from the error code encoder 31 to the hard disk devices 271 to 275 and the error correction code data to the hard disk device 276. Consequently, the hard disk devices 271 to 275 operates as the hard disk devices for recording and reproducing the encoded video and audio data; the hard disk device 276 operates as the hard disk for recording and reproducing the error correction code data.

The description will be made of the position relation of each data block and the error correction code data on each hard disk when each data block and the error correction code data are recorded on each hard disk in the hard disk devices 271 to 276, referring to FIGS. 4(A) to 4(F).

Figure 4A:
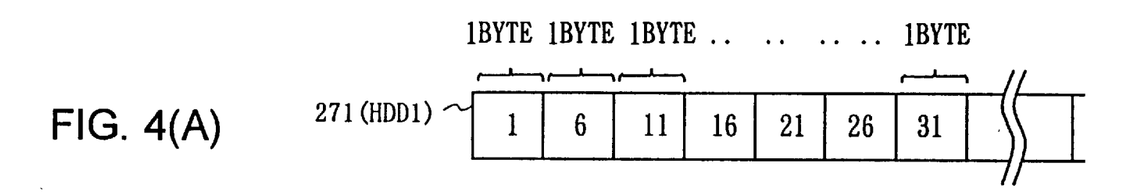
FIGS. 4(A) to 4(F) are schematic diagrams explaining an embodiment of recording position of video and audio data in the AV server system shown in FIG. 1.

First, the description will be made of the allocation of respective data blocks when the encoded video and audio data is recorded on the hard disk in the hard disk device 271, referring to FIG. 4(A). The encoded video and audio data is divided into five by a predetermined data amount, for example five bytes. Then, the head data block of one-byte data blocks which are divided into five is supplied to the hard disk device 271 and recorded on the vacant tracks on the hard disk continuously. If the divided data blocks are numbered serially to identify, data blocks 1, 6, 11, 16, 21, 26, 31, . . . are consecutively recorded on the hard disk in the hard disk device 271, as shown in FIG. 4(A). All the data blocks 1, 6, 11, 16, 21, 26, 31, . . . are the head data blocks of one-byte data blocks which are divided into five.

Figure 4B:
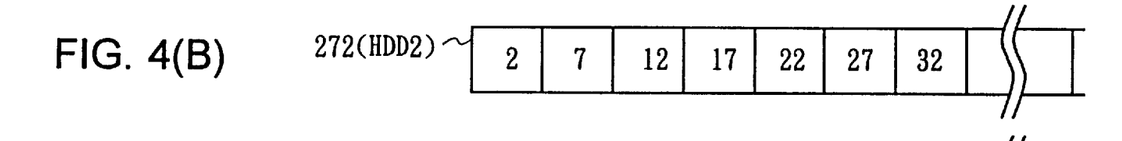

Data blocks 2, 7, 12, 17, 22, 27, 32, . . . are consecutively recorded on the hard disk in the hard disk device 272, as shown in FIG. 4(B). All the data blocks 2, 7, 12, 17, 22, 27, 32, . . . are the second data blocks of the one-byte data blocks which are divided into five.

Figure 4C:
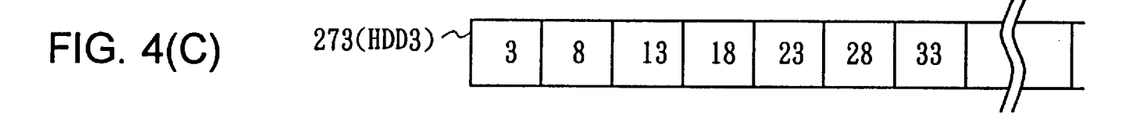

Data blocks 3, 8, 13, 18, 23, 28, 33, . . . are consecutively recorded on the hard disk in the hard disk device 273, as shown in FIG. 4(C). All the data blocks 3, 8, 13, 18, 23, 28, 33, . . . are the third data blocks of the one-byte data blocks which are divided into five.

Figure 4D:
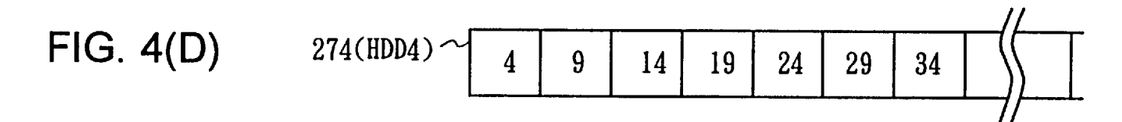

Data blocks 4, 9, 14, 19, 24, 29, 34, . . . are consecutively recorded on the hard disk in the hard disk device 274, as shown in FIG. 4(D). All the data blocks 4, 9, 14, 19, 24, 29, 34, . . . are the fourth data blocks of the one-byte data blocks which are divided into five.

Figure 4E:
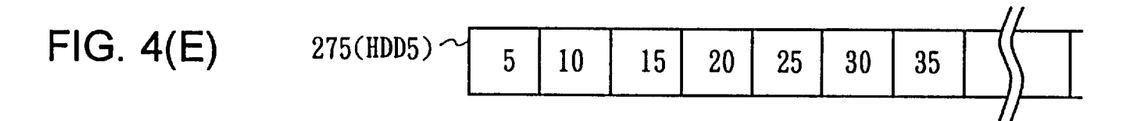

Data blocks 5, 10, 15, 20, 25, 30, 35, . . . are consecutively recorded on the hard disk in the hard disk device 275, as shown in FIG. 4(E). All the data blocks 5, 10, 15, 20, 25, 30, 35, . . . are the fifth data blocks of the one-byte data blocks which are divided into five.

Figure 4F:
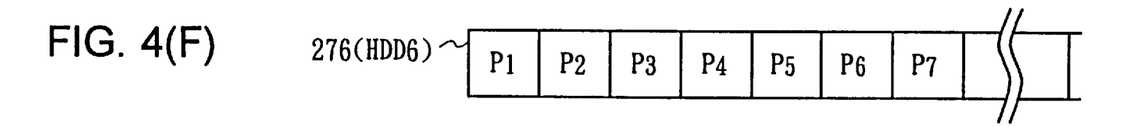

Error correction code data P1 generated to the data blocks 1, 2, 3, 4, 5, error correction code data P2 generated to the data blocks 6, 7, 8. 9, 10, error correction code data P3 generated to the data blocks 11, 12, 13, 14, 15, error correction code data P4 generated to the data blocks 16, 17, 18, 19, 20, error correction code data P5 generated to the data blocks 21, 22, 23, 24, 25, error correction code data P6 generated to the data blocks 26, 27, 28, 29, 30, error correction code data P7 generated to the data blocks 31, 32, 33, 34, 35, . . . are consecutively recorded on the hard disk in the hard disk device 276, as shown in FIG. 4(F).

Next, the description will be made of the recording format to the hard disks in the hard disk devices 271 to 276 shown in FIG. 2, referring to FIG. 5. Following areas are allocated on the hard disks in order from outer circular track to inner circular track: ID area in which discrimination data of format system is recorded; format area in which the data concerning address of record starting sector and size of each information data recorded on the disk is recorded; information data area in which encoded video and audio data is recorded; and control data area in which clip information data containing disc control information and encoded video and audio data is recorded.

The control data area is divided into the following areas: system information area in which register data of clip information is recorded; file information area in which each clip information data is recorded; and file allocation table area in which the data for controlling recording position of the encoded video and audio data and the error correction code data on the hard disk per cluster are recorded. In this connection, the reserved areas are arranged for the extension.

Figure 5:
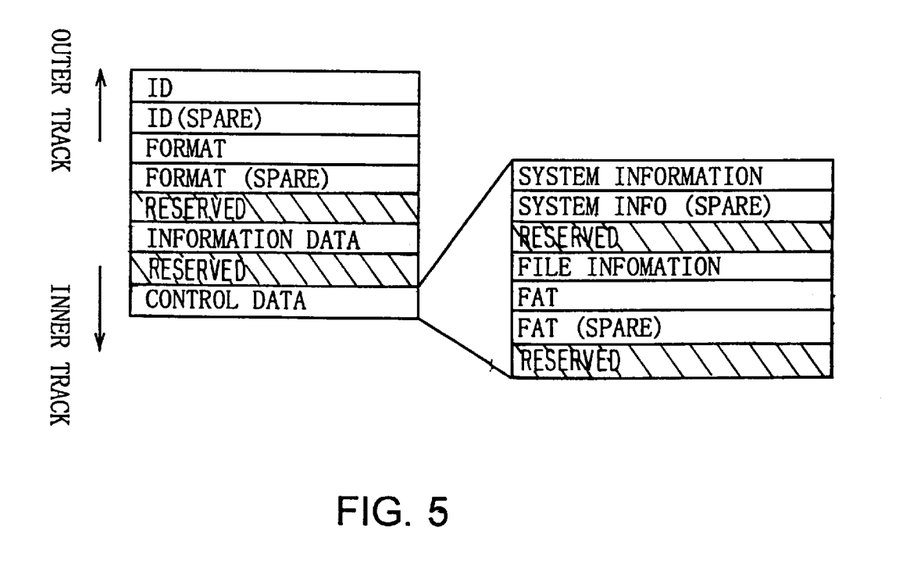
FIG. 5 is a schematic diagram showing an example of the recording format of a recording medium in the AV server system shown in FIG. 1.
Figure 6:
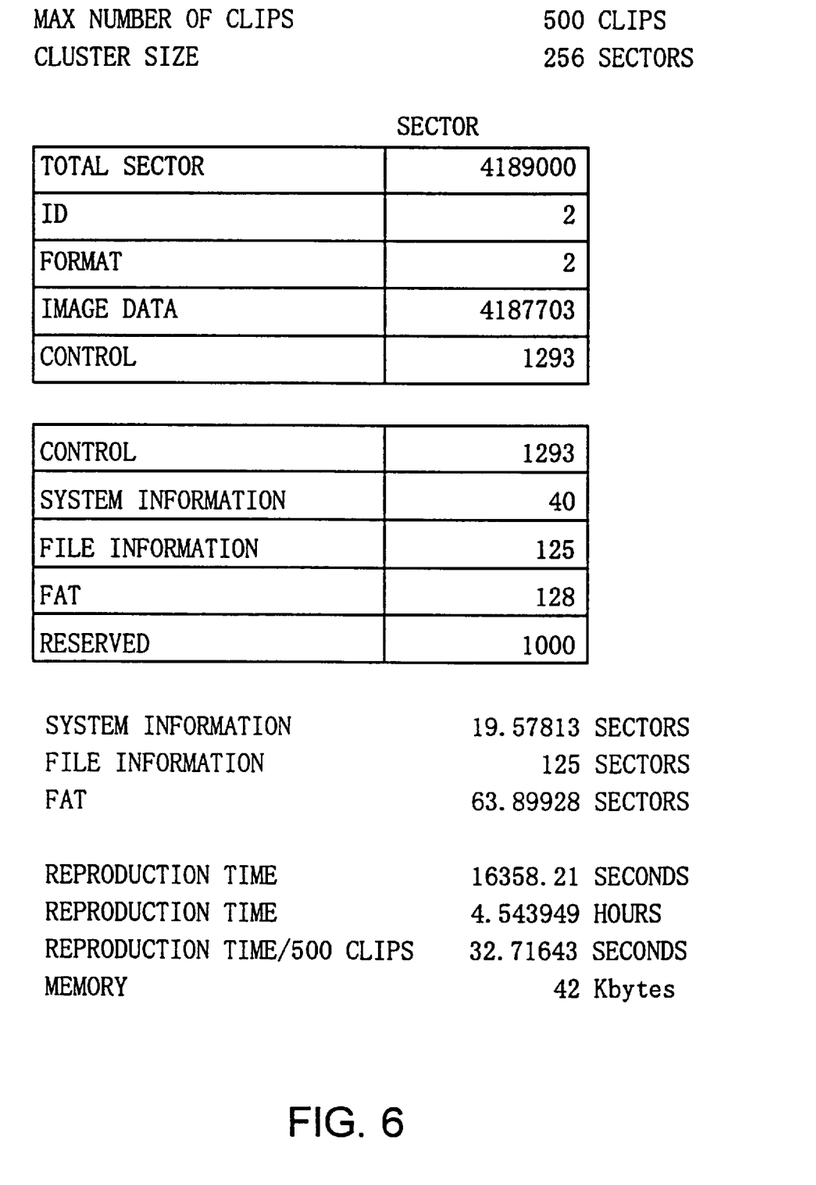
FIG. 6 is a schematic diagram showing an example of sector allocation to each area of the recording format shown in FIG. 5.

FIG. 6 shows an example of number of sector allocated to each area in the case where recording format of the hard disk with the capacity of, for example, 2.15 [Gbyte] is arranged as shown in FIG. 5.

Next, the description will be made of the operation of reproduction of the encoded video and audio data from the hard disk devices 271 to 276 shown in FIG. 2 and supply of the decoded video and audio data to terminal devices.

The terminal devices 28A1 to 28A12 shown in FIG. 1 respectively transmits demand data regarding the video and audio data to be received via a transmission line S20 to the control device 29. The control device 29 supplies reproduction control signal for transmitting the video and audio data demanded by each terminal device via the control line S2 to the media control unit 26 in the server unit 25. The reproduction control signal supplied to the media control unit 26 is supplied to the main CPU 33 in the media control unit 26 (FIG. 2). Based on the reproduction control signal, the main CPU 33 supplies the control signal for reproducing the demanded video and audio data and error correction code data via the control line S6 to the CPU 44 in the input/output units 32A to 32C (FIG. 3), respectively.

Then, the input/output units 32A to 32C reproduce the demanded video and audio data and error correction code data from each hard disk based on the control signal for reproduction supplied from the main CPU 33. In order to simplify the description, the reproduction operation of the input/output unit 32A is described referring to FIG. 3.

First, the CPU 44 reads out the data concerning management of recording position of the encoded video and audio data and error correction code data on the hard disks, address of the record starting sector of each information data recorded on the hard disks and the data concerning size of each information data recorded on the hard disk from each hard disk via the interface 42 or 43 so as to store in an FAT memory 47.

Next, the CPU 44 obtains the recording position of the demanded encoded video and audio data and error correction code data on the hard disk referring to the data stored in the FAT memory 47, and supplies the control signal via a control line S8 to the interfaces 42 and 43 in order that the encoded video and audio data and error correction code data are reproduced from the recording position.

The interfaces 42 and 43 controls the operation of the hard disk devices 271 and 272 based on the control signal from the CPU 44 in order that the demanded encoded video and audio data is read out from the hard disks. Therefore, for example, assuming that the encoded video and audio data and error correction data demanded at this time are composed as shown in FIGS. 4(A) to 4(F), the hard disk device 271 sequentially reproduces the data blocks 1, 6, 11, 16, 21, 26, 31 . . . shown in FIG. 4(A); the hard disk device 272 sequentially reproduces the data blocks 2, 7, 12, 17, 22, 27, 32 . . . shown in FIG. 4(B).

The data blocks 1, 6, 11, 16, 21, 26, 31 . . . and 2, 7, 12, 17, 22, 27, 32 . . . reproduced by the hard disk devices 271 and 272 are respectively supplied to the buffer memories 40 and 41. Once being stored, then the data blocks are supplied to an error code decoder 34 in the media control unit shown in FIG. 2 via a signal line S30. The data is read out from the buffer memories 40 and 41 based on read-out control signal supplied from the error code decoder 34 to the buffer memories 40 and 41, which is not shown in figures.

In the same manner, the hard disk device 273 sequentially reproduces the data blocks 3, 8, 13, 18, 23, 28, 33 . . . shown in FIG. 4(C) under the control of the input/output unit 32B. Further, the hard disk device 274 sequentially reproduces the data blocks 4, 9, 14, 19, 24, 29, 34 . . . shown in FIG. 4(D) under the control of the input/output unit 32B. Further, the hard disk device 275 sequentially reproduces the data blocks 5, 10, 15, 20, 25, 30, 35 . . . shown in FIG. 4(E) under the control of the input/output unit 32C. Further, the hard disk device 276 sequentially reproduces the error correction code data P1, P2, P3, P4, P5, P6, P7, . . . shown in FIG. 4(F) under the control of the input/output unit 32C.

The data blocks 3, 8, 13, 18, 23, 28, 33 . . . 4, 9, 14, 19, 24, 29, 34 . . . 5, 10, 15, 20, 25, 30, 35 . . . and the error correction code data P1, P2, P3, P4, P5, P6, P7, . . . which are reproduced in the hard disk devices 273 to 276 are once stored in one of (or another) buffer memories respectively, and then supplied to the error code decoder 34 in the media control unit shown in FIG. 2.

The error code decoder 34 corrects the error in the data blocks 1, 2, 3, 4, 5 supplied from the input/output units 32A to 32C using the error correction code data P1. Further, the error code decoder 34 corrects the error in the data blocks 6, 7, 8, 9, 10 supplied from the input/output units 32A to 32C using the error correction code data P2. Further, the error code decoder 34 corrects the error in the data blocks 11, 12, 13, 14, 15 using the error correction code data P3. Further, the error code decoder 34 corrects the error in the data blocks 16, 17, 18, 19, 20 using the error correction code data P4. Further, the error code decoder 34 corrects the error in the data blocks 21, 22, 23, 24, 25 using the error correction code data P5. Further, the error code decoder 34 corrects the error in the data blocks 26, 27, 28, 29, 30 using the error correction code data P6. Further, the error code decoder 34 corrects the error in the data blocks 31, 32, 33, 34, 35 using the error correction code data P7. After this manner, the error code decoder 34 outputs each data block whose error is corrected in order of the block number, and supplies to the specified decoder out of the decoders 35A to 35L based on the indication signal, which is supplied from the main CPU 33 via the control line S9, indicating the position to be transmitted.

The error correction code described above can restore each data in one data block by using the data in the other four data blocks out of five data blocks. This means that, if one of the hard disk devices 271 to 276 cannot reproduce normally for some reason, each data in the data blocks supplied from remained four hard disk devices and the error correction code data reproduced from the hard disk devices 276 can restore the data to be reproduced in the error code decoder 34 from the hard disk device which is out of order.

The description will be made of the reproduction operation of the server unit 25 in the case where, for example, the terminal device 28A1 transmits the reception demand of video and audio data A to the control device 29, the terminal device 28A2 transmits the reception demand of video and audio data B other than the video and audio data A to the control device 29, and the terminal device 28A3 transmits the reception demand of video and audio data C other than the video and audio data A and B to the control device 29.

The terminal device 28A1, the terminal device 28A2 and the terminal device 28A3 respectively transmit the reception demand data concerning the video and audio data A, the video and audio data B and the video and audio data C via the transmission line S20 to the control device 29. The control device 29 supplies the reproduction control signal for transmitting the video and audio data A, the video and audio data B and the video and audio data C which are demanded from the terminal device 28A1, the terminal device 28A2 and the terminal device 28A3 via the control line S2 to the media control unit 26 in the server unit 25. The reproduction control signal supplied to the media control unit 26 is supplied to the main CPU 33 in the media control unit 26. The main CPU 33 respectively supplies the control signal for reproducing the demanded video and audio data A, B, C and the error correction code data for the data A, B, and C from respective hard disks via the control line S6 to the CPU 44 in the input/output units 32A to 32C, based on the reproduction control signal.

As shown in FIG. 3, the CPU 44 reads the data concerning management of the recording position of plural kinds of encoded video and audio data and error correction code data per cluster and the data concerning the address of the recording start sector of each information data and the size of each information data from the hard disks so as to store them in the FAT memory 47.

Next, the CPU 44 obtains the recording position of the encoded video and audio data and error correction code data on the hard disks by referring the data stored in the FAT memory 47, and supplies the control signal via the control line SB to the interfaces 42 and 43 so that the encoded video and audio data and error correction code data are reproduced.

The interfaces 42 and 43 controls the operation of the hard disk devices 271 to 276 based on the control signal supplied from the CPU 44 via the control line SB so that the demanded encoded video and audio data and error correction code data are respectively read out from the hard disks. The encoded video and audio data and error correction code data both of which are read out from the hard disk devices 271 to 276 are thereby supplied to and once stored in one of (or another) buffer memories 40 and 41 by time sharing, and then supplied to the error code decoder 34 in the media control unit shown in FIG. 2.

The error code decoder 34 corrects errors of the encoded video and audio data supplied from the input/output units 32A to 32C by using the error correction code data. The error code decoder 34 outputs the data blocks whose errors are corrected by kinds of the encoded video and audio data in order of the block number, and supplies the encoded video and audio data A to the decoder 35A, the encoded video and audio data B to the decoder 35B, and the encoded video and audio data C to the decoder 35C based on the indication signal supplied from the main CPU 33 which indicates the position to be transmitted.

The decoders 35A, 35B and 35C respectively decodes and extends the supplied encoded video and audio data, and transmits the sequence real-timed video and audio data to the terminal devices 28A, 28B and 28C.

The encoded video and audio data and error correction data read out from the hard disk devices 271 to 276 are supplied to and once stored in one of (or another) buffer memories 40 and 41, and then supplied to the error code decoder 34 in the media control unit 26 shown in FIG. 2 by time sharing. The data are corrected its error at the error code decoder 34 and distributed to the decoder 35A, 35B and 35C. The decoding and extension processing at the decoders 35A, 35B and 35C makes the encoded video and audio data sequence and real-timed video and audio data.

Further, the encoded video and audio data A, the encoded video and audio data B, and the encoded video and audio data C are recorded on the hard disk being mixed with each other. In order to minimize the movement of the recording and reproducing head of the hard disk device and shorten the access time at the time of reproducing the encoded video and audio data A, B, and C from the hard disks, it is preferable to select the reproduction order of the encoded video and audio data so that, for example, the recording and reproducing head moves from external circumference to internal circumference of the hard disk with regularity.

A sorting circuit 45 shown in FIG. 3 is utilized for the selection of the reproduction order. The CPU 44 obtains the recording position of the demanded encoded video and audio data and error correction code data on the hard disk referring the data stored in the FAT memory 47, and supplies the data indicating the recording position to the sorting circuit 45. The sorting circuit 45 replaces, for example, the data indicating the position of the external circumference side of the hard disk with the data indicating the position of the internal circumference side, and then supplies it to the CPU 44. The CPU 44 supplies the control signal via the control line S8 to the interfaces 42 and 43 so that the encoded video and audio data and error correction code data are reproduced according to the replaced data. The recording and reproducing head thereby can reproduce the encoded video and audio data and error correction code data A, B, and C, with moving from the external circumference to the internal circumference with regularity.

In the manner described later, the server unit 25 of the present embodiment can supply the encoded video and audio data from the hard disk devices to the decoder unit 35 without delay more than the predetermined time.

When receiving the demand to read out the video and audio data from the terminal devices 28A1 to 28A12, the server unit 25 reads the predetermined number of data blocks, for example 128000*12/5=307200 blocks, out from each hard disk as one read-out block together. 307200 data blocks being read out from each hard disk within one second by each hard disk device, twelve terminal devices thereby can be sequentially supplied the video and audio signal different from each other. Each hard disk device is set its reproduction capability so as to read 307200 data blocks within 950 [msec] out from the hard disk.

Figure 7A:
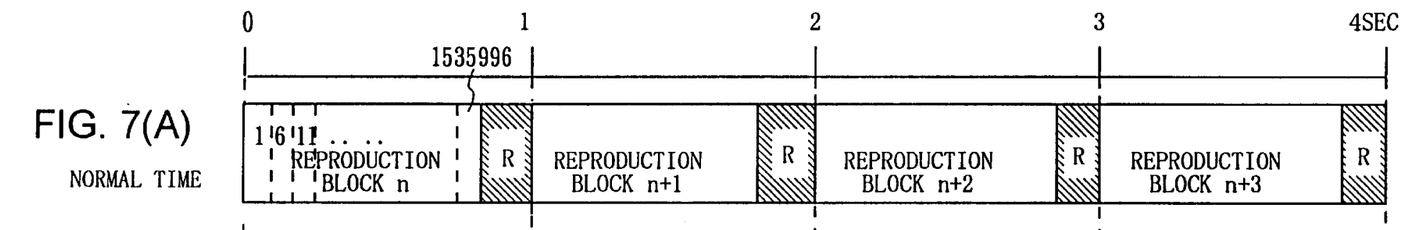
FIGS. 7(A) to 7(C) are schematic diagrams explaining the operation of the information signal reproducing apparatus of the present invention.
Figure 7B:
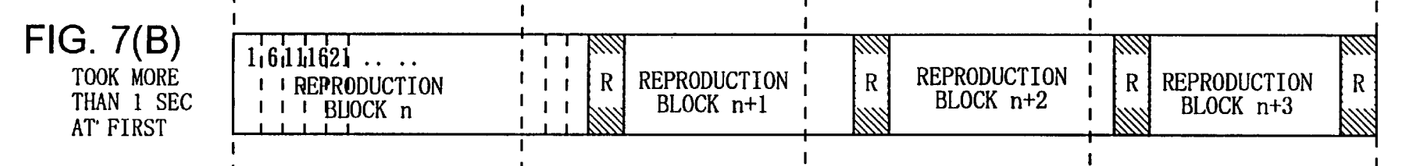
Figure 7C:
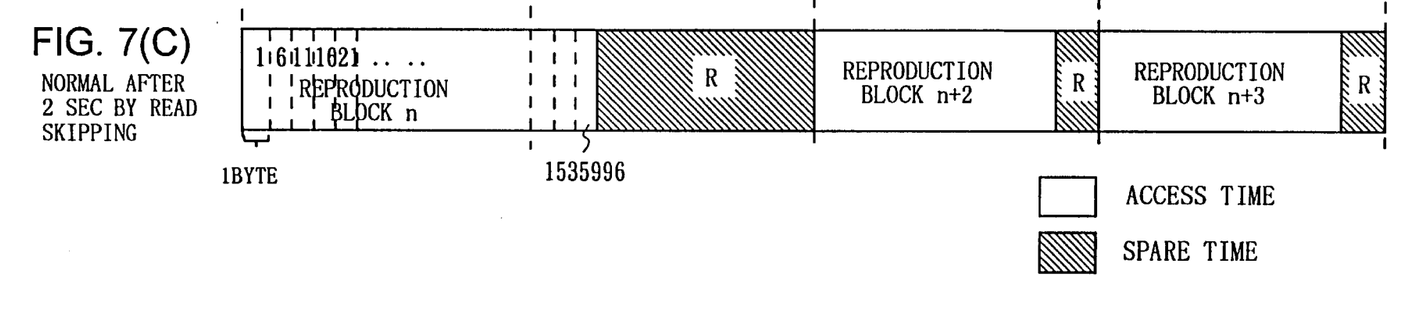

The CPU 44 of the input/output units 32A, 32B and 32C indirectly supervises whether or not the reproduction block (n: "n" is a positive integer) being reproduced at present from the hard disk is completed to read out within a predetermined time, for example within 950 [msec] by determining whether or not the next reproduction block (n+1) is started to reproduce at the predetermined timing, for example 2 [sec] after the reproduction starts. In FIGS. 7(A) to 7(C), each area R shown by oblique lines is spare time which corresponds to overhead time required for switching control of the reproduction blocks; it is 50 [msec] in this embodiment. Thus, if it takes 950 [msec] or more to reproduce the reproduction block (n), the reproduction block (n+1) cannot be started reproducing at the predetermined timing. The description will be made of the read-out operation of the reproduction blocks from the hard disks when the data has read out within the predetermined time, for example 950 [msec], referring FIG. 7(A). In this case, since all reproduction blocks n, n+1, n+2, n+3, ... are completed to be read out within 950 [msec], all reproduction blocks n, n+1, n+2, n+3, ... are sequentially reproduced from the hard disks by the hard disk devices. Each reproduction block shown in FIG. 7(A) consists of a group of 307200 data blocks shown in FIG. 4(A).

Next, when the head is moved to the track of the hard disk on which the reproduction block "n" is recorded to access the encoded video and audio data, the position of the recording and reproducing head may be shifted due to expansion and shrink of the members caused by temperature or mechanical error. For that, the recording and reproducing head is corrected its position and accessed again, and therefore the reproduction of the reproduction block n is completed in, for instance, 1.3 [sec]. The description will be made of the read-out operation of the reproduction blocks from the hard disks in the above-mentioned case referring to FIG. 7(B). In this case, since it takes 1.3 [sec] to read out the reproduction block "n", the reproduction block n+1 next to the reproduction block "n" is started being read out at the timing, that is 0.3 [sec] late from the specified timing. The read-out finishing timing of the reproduction block n+1 resultingly passes over the predetermined timing, e.g., 2 [sec] from the starting point of reproduction operation, by which the read-out finishing timing of the reproduction block n+2 also passes over the specified timing, e.g., 2 [sec] from the starting point of reproduction operation. Also, the delayed timing further have a bad influence upon reproduction timing of some succeeding reproduction blocks.

The delayed timing may make continuous supply of the video and audio data to the terminal device impossible. More specifically, the delayed timing causes the video and audio data reproduced from this hard disk not to be the object of the restoration. Accordingly, the video and audio data is restored from the other encoded video and audio data of reproduction block reproduced from the other four hard disks by using the error correction code data, and then supplied to the terminal device, which does not terminate the video and audio data directly. If, however, there arises an error in the encoded video and audio data in one of reproduction block reproduced from the other four hard disks, it becomes impossible to restore the encoded video and audio data and they are terminated.

As described above, no delay of reproduction timing can reproduce effective video and audio data, nevertheless this encoded video and audio data becomes not effective just because the reproduction timing is delayed. The delay may therefore cause the termination of supply of the video and audio data to the terminal devices with higher possibility. More specifically, even if one of five data blocks is lacked, the error correction code used in this embodiment can restore the data of lacked data block from the remained four data blocks. Beside if one data block is unavailable during the period equivalent to plural reproduction blocks, the error of the encoded video and audio data in only one data block out of the other four data blocks results in the termination of the video and audio data firsthand. Next, the description will be made of the reproduction operation in this embodiment referring to FIG. 7(C). FIG. 7(C) shows the example of reading out of the reproduction block n which takes 1.3 [sec] for the same reason as FIG. 7(B). Since it takes 950 [msec] or more to read out the reproduction block "n", the CPU 44 controls the reading out operation of the hard disks so as not to read out the data of the reproduction block (n+1) which is to read out next from the hard disk by the same hard disk but the data of the reproduction block (n+2) which is to be read out next to (n+1) at the specified timing, e.g., 2 [sec] later from the reproduction operation starting point.

Then, the data of the unreaded reproduction block (n+1) is restored from the four data blocks which are read out by the other four hard disk devices and the error correction code data by processing above-mentioned error correction in the error code decoder 34. After that, the data is supplied to the predetermined decoder in the decoder unit 35.

As a result, the timing of reading out after the reproduction block (n+2) by the hard disk devices is not delayed from the specified timing, which brings down the possibility of termination of the video and audio data for supplying to the terminal devices, compared with the case described referring to FIG. 7(B) in which reproduction is operated.

Figure 8:
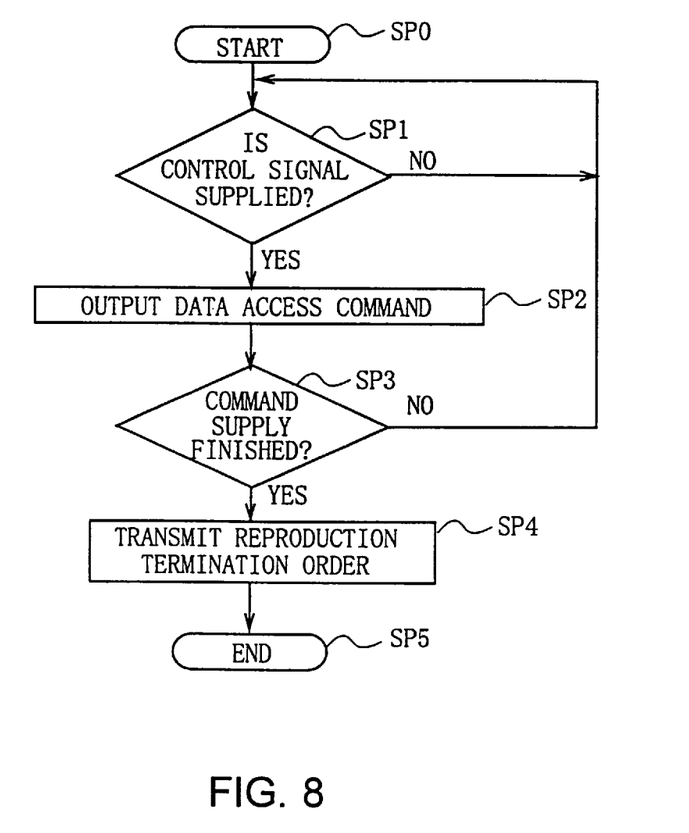
FIG. 8 is a flow chart showing an embodiment of the operation of the main CPU in the server unit shown in FIG. 2.

Next will be the description of an example of the operation of the main CPU 33 in the media control unit 26 referring to a flow chart shown in FIG. 8.

The main CPU 33 starts operating at step SP0.

At step SP1, the main CPU 33 waits till the reproduction control signal for transmitting the video and audio data demanded by each terminal device from the control device 29 via the control line S2. Then, receiving the reproduction control signal from the control device 29, the main CPU 33 proceeds to step SP2.

At step SP2, based on the reproduction control signal the main CPU 33 supplies the control signal, as data access command, for reproducing the demanded encoded video and audio data and the error correction code data in every reproduction block via the control line S6 to the CPU 44 in the input/output units 32A to 32C.

At step SP3, the main CPU 33 determines whether or not supply of the data access command to the CPU 44 in the input/output units 32A to 32C. If a negative result "NO" is obtained, the main CPU 33 returns to step SP1; if an affirmative result "YES" is obtained, the main CPU 44 proceeds to step SP4 to supply the reproduction termination order to the CPU 44 in the input/output units 32A to 32C and then proceeds to step SP5 to terminate a series of process.

Figure 9:
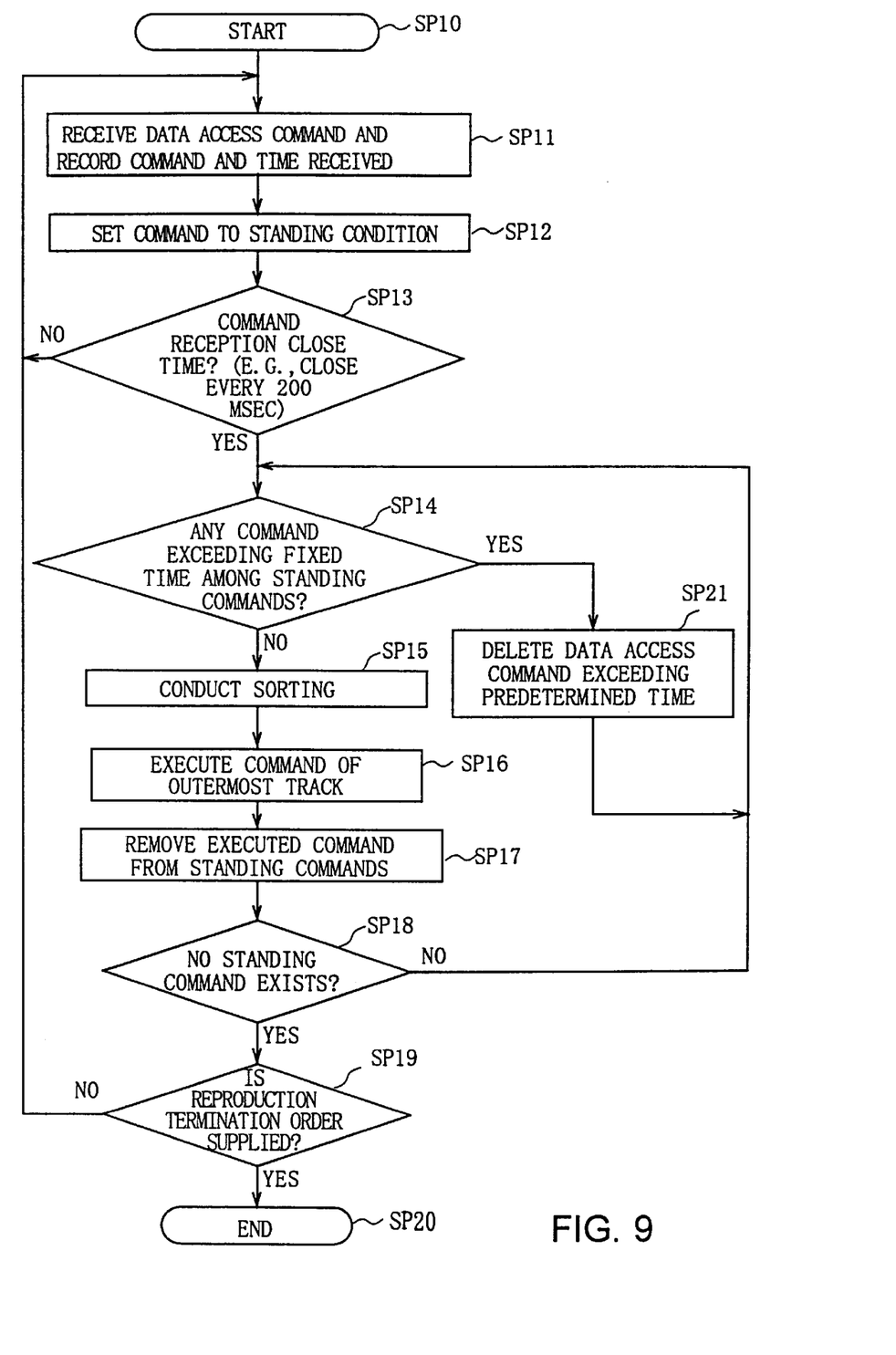
FIG. 9 is a flow chart showing an embodiment of the operation of the CPU in the input/output unit shown in FIG. 3.

Next will be the description of an example of the operation of the CPU 44 in the input/output units 32A to 32C referring to a flow chart shown in FIG. 9.

The main CPU 44 starts its operation at step SP10.

The CPU44 receives aforementioned data access command from the main CPU33 at step SP11 and as well as recording the content of command in the internal memory which is not shown in the figure, records the time of receiving the data access command on a timer 46 (FIG. 3). Each data access command correspond to each reproduction block of demanded encoded video and audio data and the error correction code data respectively. Each data access command represents the corresponding reproduction block's type, reproduction starting timing, and so on.

The CPU 44 is in a condition of waiting for each content of command in the data access command at step SP12, and then proceeds to step SP13.

Referring to the passed time data supplied from the timer 46, the CPU 44 determines at step SP13 whether or not it is time to terminate the reception, e.g., whether or not the passed time data supplied from the timer 46 lapses 200 [msec]; if it has not been time to terminate the reception, the CPU 44 returns to step SP11 to receive next data access command from the main CPU 33. On the other hand, determining that it has been time to terminate the reception because of the lapse of 200 [msec], the CPU 44 proceeds to next step SP14. In such a manner, by repeating from step SP11 to step SP13 by the time to terminate the reception, the CPU 44 can store plural data access commands.

At step SP14, the CPU 44 determines whether or not there is any command whose reproduction starting timing represented by the data access command has already lapsed out of the data access commands which are standing by. If an affirmative result "YES" is obtained at step SP14, the CPU 44 proceeds to step SP21 to transmit to the main CPU 33 that data access command whose reproduction starting timing has already lapsed should be deleted, and at the same time deletes the data access command from the internal memory. Then, the CPU 44 returns to step SP14 again.

If a negative result "NO" is obtained at step SP14, the CPU 44 proceeds to step SP15 to extract the data representing the recording position of the reproduction block indicated by each data access command from the FAT memory 47 and supplies the data representing the recording position to the sorting circuit 45. The sorting circuit 45 rearranges plural supplied data representing the recording position in order that the seeking time is the minimum, e.g., from outer track to inner track of the hard disk.

Next, at step SP16 the CPU 44 controls the hard disk devices so that the encoded video and audio data and the error correction code data positioned in the outermost track is read out from the hard disk based on the data representing the recording position rearranged in the sorting circuit 45 and the data representing the reproduction starting timing.

At step SP17, the CPU 44 deletes the data access command executed at step SP16 from the internal memory.

Next, at step SP18 the CPU 44 determines whether or not there is any standing-by data access command in the inside memory. If a negative result "NO" is obtained at step SP18, the CPU 44 returns to step SP14; if an affirmative result "YES" is obtained, the CPU 44 proceeds to step SP19.

At step SP19, the main CPU 33 determines whether or not the CPU 33 is supplied with the reproduction termination order; if a negative result "NO" is obtained, the CPU 44 returns to step SP11. If an affirmative result "YES" is obtained, the CPU 44 proceeds to step SP20 to terminate a series of process.

In such a manner, the server unit 25 can succeedingly supply the demanded video and audio data to respective demanding terminal devices in reply to the demand from respective terminal devices 28A1 to 28A12.

Incidentally, the embodiment described above has mentioned the case of using the hard disks, but magneto-optical disk devices and optical disk devices can be used as the disk device.

The information signal reproducing apparatus and information signal reproducing method of the present invention also can be applied to an AV server whose main construction is only the server unit 25.

Further, the information signal reproducing apparatus and information signal reproducing method of the present invention can be applied to systems other than the AV server system.

Further, the data supplying source 22 in FIG. 1 comprises the video tape recorder, however, the data supplying source is not limited to this but various recording methods such as a video disc can be applied.

Industrial Applicability

In an audio and/or video server system having a disc recording medium as a recording medium, the present invention can be applied to the system which reproduces an information signal from a recording medium of a media unit and transmits it to terminal devices.

I claim:

1. An information signal reproducing apparatus for outputting information data reproduced from a recording medium, comprising:

plural reproduction means for reproducing from plural disc recording media said information data in the form of reproduction blocks, each reproduction block being composed of a predetermined number of plural data blocks and in which adjacent data blocks of said plural data blocks are separated from each other and recorded in different disc recording media;

error correction code reproduction means for reproducing error correction code data, which is generated for each respective data block of said plural data blocks and recorded on another disc recording medium;

error correction means for restoring correct data to be reproduced in a certain reproduction means of said plural reproduction means using both data reproduced by said plural reproduction means and an error correction code data reproduced by said error correction code reproduction means when there is an error in the data of said data block reproduced by said certain reproduction means or when the data is not reproduced by said certain reproduction means;

control means for controlling an operation of said plural reproduction means and said error correction code reproduction means; and wherein when said certain reproduction means has not finished reproducing an n-th (n is a positive integer) reproduction block by a predetermined time, said control means controls the operation of said plural reproduction means so that said certain reproduction means does not reproduce an n+1-th reproduction block but an n+2-th reproduction block.

2. The information signal reproducing apparatus according to claim 1, wherein said information data is divided into plural data blocks according to a predetermined amount of data and recorded on said plural disc recording media; and each m-th (m=1, 2, 3, . . . ) data block is reproduced by an m-th reproduction means from among said plural reproduction means.

3. An information signal reproducing apparatus for outputting information data reproduced from a recording medium, comprising:

plural reproduction means for reproducing from plural disc recording media said information data in the form of reproduction blocks, each reproduction block being composed of a predetermined number of plural data blocks and in which adjacent data blocks of said plural data blocks are separated from each other and recorded in different disc recording media;

error correction code reproduction means for reproducing error correction code data, which is generated for each respective data block of said plural data blocks, from another disc recording medium;

error correction means for restoring correct data to be reproduced in a certain reproduction means of said plural reproduction means using both data reproduced by said plural reproduction means other than said certain reproduction means and an error correction code data reproduced by said error correction code reproduction means when there is an error in the data of said data block reproduced by said certain reproduction means or the data is not reproduced by said above certain reproduction means;

control means for controlling an operation of said plural reproduction means and said error correction code reproduction means; and wherein when said certain reproduction means has not started reproducing an n+1-th ("n" is a positive integer) reproduction block at a predetermined timing, said control means controls the operation of said plural reproduction means so that said certain reproduction means does not reproduce an n+1-th reproduction block but an n+2-th reproduction block.

4. The information signal reproducing apparatus according to claim 3, wherein said information data is divided into plural data blocks according to a predetermined amount of data and recorded on said plural disc recording media; and each m-th (m=1, 2, 3, . . . ) data block is reproduced by an m-th reproduction means from among said plural reproduction means.

5. An information signal reproducing method for outputting information data reproduced from the recording medium, comprising the steps of:

reproducing, from plural disc recording media, said information data in the form of reproduction blocks, each reproduction block being composed of a predetermined number of plural data blocks and recorded separately from adjacent data blocks on different plural disc recording media, each reproduction block being composed of a predetermined number of said plural data blocks;

reproducing error correction code data, which is generated for each respective data block of said plural data blocks and recorded on another disc recording medium;

restoring correct data, reproduced from a certain disc recording medium of said plural disc recording media, using both data reproduced from said plural disc recording media other than said certain disc recording medium and said reproduced error correction code data when there is an error in the data of said data block reproduced from said certain disc recording medium or the data is not reproduced from said certain disc recording medium; and wherein when said step of reproducing said information data has not finished reproducing an n-th ("n" is a positive integer) reproduction block by a predetermined time, an n+1-th reproduction block is not reproduced from said certain disc recording medium but an n+2-th reproduction block is reproduced.

6. An information signal reproducing method for outputting information data reproduced from a recording medium, comprising the steps of:

reproducing, from plural disc recording media, said information data in the form of reproduction blocks, each reproduction block being composed of a predetermined number of plural data blocks and in which adjacent data blocks of said data blocks are separated from each other and recorded in different disc recording media;

reproducing error correction code data, which is generated for each respective data block of said plural data blocks and recorded on another disc recording medium;

restoring correct data to be reproduced from a certain disc recording medium of said plural disc recording media using both data reproduced from said plural disc recording media other than said certain disc recording medium and said reproduced error correction code data when there is an error in the data of said data block reproduced from said certain disc recording medium or the data is not reproduced from said certain disc recording medium; and wherein when said certain reproduction means has not started reproducing an n+1-th (n is a positive integer) reproduction block at a predetermined timing, an n+1-th reproduction block is not reproduced from said certain disc recording medium but an n+2-th reproduction block is reproduced.

* * * * *